Figure 1:
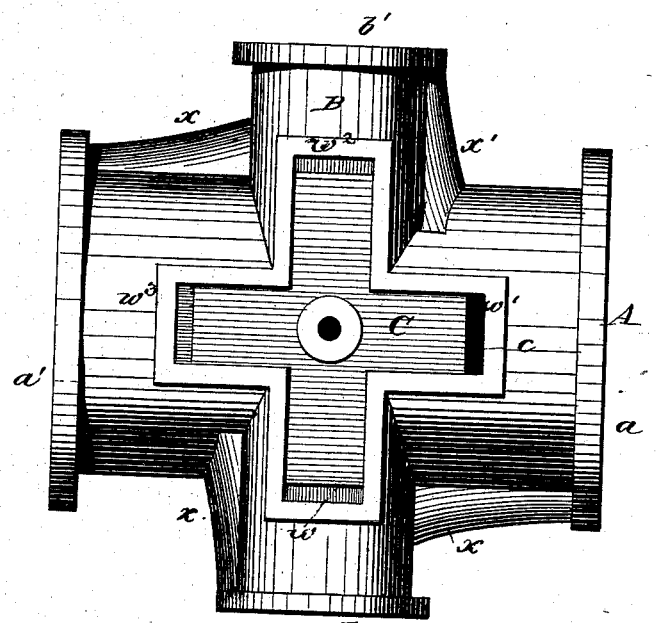

(Model.)

P. WELLS.
WATER METER.

No. 254,744.   Patented Mar. 7, 1882.

WITNESSES
Fred. G. Dieterich.
P. C. Dieterich.

INVENTOR
Parker Wells.
By DeLoy Smith
Attorney (Model.)

P. WELLS.
WATER METER.

No. 254,744. Patented Mar. 7, 1882.

WITNESSES
Fred. G. Dieterich.
F. C. Dieterich.

INVENTOR
Parker Wells.
By H. Clay Smith
Attorney

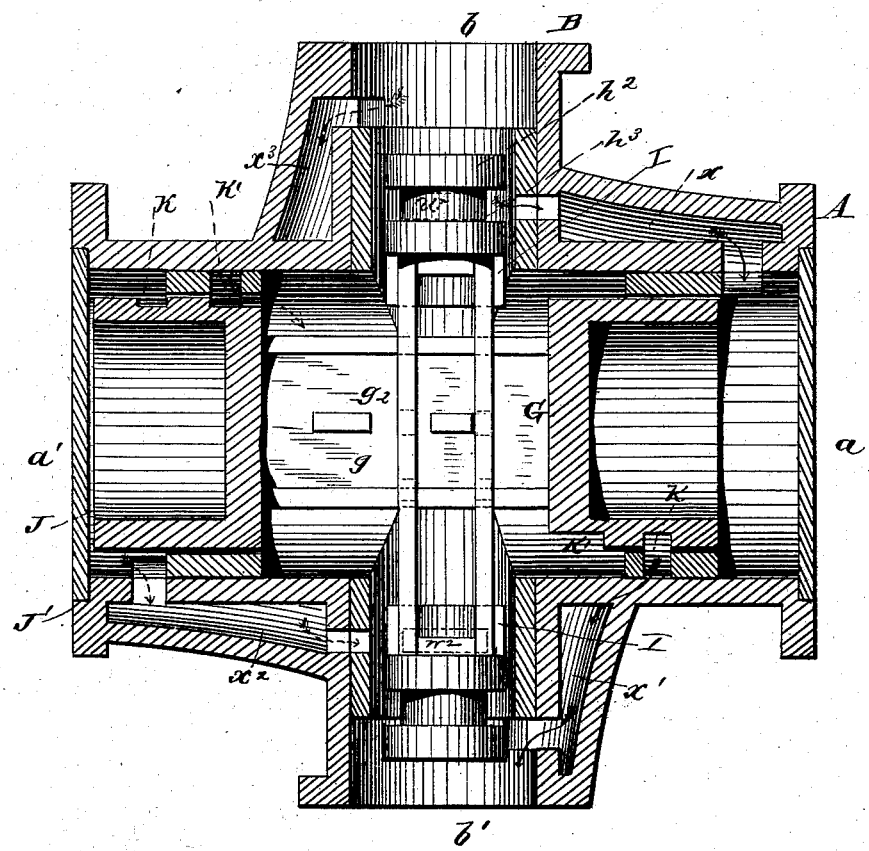

UNITED STATES PATENT OFFICE.

PARKER WELLS, OF LYNN, MASSACHUSETTS.

WATER-METER.

SPECIFICATION forming part of Letters Patent No. 254,744, dated March 7, 1882.

Application filed October 12, 1881. (Model.)

*To all whom it may concern:*

Be it known that I, PARKER WELLS, a citizen of the United States, residing at Lynn, in the county of Essex and State of Massachusetts, have invented certain new and useful Improvements in Water-Meters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to water-meters adapted to measure and register quantities of water as fed to halls, hotels, public buildings, dwelling-houses, and the like; and the novelty consists in the construction and arrangement of parts, as will be more fully hereinafter set forth, and specifically pointed out in the claims.

The object of the invention is to measure the volume of water or other liquid passing or flowing through pipes, and to properly register the same, so that the quantity of water used will be properly charged to the party using it.

In carrying out the invention I employ what I shall for convenience term a "main" and "auxiliary" cylinder, the auxiliary cylinder being of smaller diameter than the main cylinder and communicating therewith at right angles. A water-chamber or receiving-chamber is located upon the under side of the meter, the inlet and outlet ports of which are arranged upon opposite sides, as shown. From this receiving-chamber two ports lead into the main cylinder and two ports into the auxiliary cylinder, while a chute or way from either end outside of the circumference of the main or auxiliary cylinders connects each with the other as the water under pressure exerts its constant force to impel a piston-valve and piston, so as to open or close the ports. The water to be measured passes upwardly through the ports as they are successively opened by the valve or piston action caused by the water-pressure, and thence is forced through a central aperture in the main cylinder into an exit-pipe arranged in the receiving-chamber.

The main piston consists essentially of two barrels or drums, sealed air-tight to overcome the gravity of the piston, connected together by a proper framing. Between these barrels is the water-space, and each barrel is provided with a segmental groove, which registers with one of the main-cylinder ports at the end of each stroke of the main piston. Connecting the barrels is a flat surface, upon the upper side of which are affixed duplicate lugs, which serve in connection with slots formed in the connecting-frame of the piston-valve or auxiliary piston, as will be more fully explained hereinafter.

The auxiliary piston is formed of two duplicate drums, in each of which is arranged an annular groove in such a manner that as the main-piston port is closed at one end and the flow of water is directed through the connecting chute or way into the chamber behind one of the heads of the auxiliary piston, and said auxiliary piston is forced over, the said annular groove upon that barrel of the auxiliary piston will register, not only with the water-port from the receiving-chamber, but also with the chute or way port which connects that particular end of the auxiliary cylinder with the adjacent end of the main cylinder. As the water enters the main cylinder behind the main piston the said piston is forced over, the lugs upon the connecting-plate riding idly through the slots in the auxiliary-piston frame until the segmental groove in one of the main-piston barrels connects with the chute-port leading to the opposite end of the auxiliary cylinder behind the opposite auxiliary-piston head, when the auxiliary piston will give the opposite stroke until the annular groove upon that drum-head registers with the chute-port leading to the main cylinder, the lugs upon the connecting-plate passing through one of the series of slots in the frame of the auxiliary piston, according as the said auxiliary piston is reciprocated and passed from side to side alternately.

It will be noticed that each piston modifies the action of the other—that is to say, they are both operated by the water-pressure—and each piston holds the other in a locked position until the connecting-chute port registers with the direct flow from the water-receiving chamber, and not until then is the next acting piston liberated. As soon, however, as the chute-port has registered with the succeeding cylinder from the main receiving-chamber, the other piston is liberated, and the lugs upon the connecting-plate of the main piston and slots in the auxiliary piston frame allow the free reciprocation of either, as will readily be understood.

It will also be noticed that both pistons reciprocate alternately, each locking the other until it is desirable for one of them to make a stroke; that both are operated by the water-pressure; that the pistons are self-operating or self-changing; that the cylinders are clear of any valve mechanism which is liable to get out of order, and that the piston-changing chutes connecting the successive cylinder-chambers are arranged outside of the cylinders, thus giving free but close action to the pistons.

In meters of this class, especially in northern climates, where frozen and burst pipes frequently cause great damage to the building, it is very desirable to empty the house-pipes, and this should be accomplished by passing the contained water in the house-pipes from the lower portions thereof into the waste well or sewer without removing the meter. I have constructed my meter to provide for such an emergency, and to this end I place a light lift-valve in direct communication with the exit-pipe. As the water from the street-main is cut off the gravity of the water contained in the house-pipes forces such water back through the said lift-valve connection into the receiving-chamber, thence through the entrance-pipe, and by a proper stop-cock (not shown) into the sewer. It being well known that the underground pipes do not freeze up, and that danger from freezing is connected to the house-connections in bath-rooms, closets, &c., the importance of emptying such house-pipes in severe weather will be readily understood. According to my invention it is only necessary to shut off the street-main connection and then open a stop-cock in the entrance-pipe, when all the water in the house-pipes and in the receiving-chamber will gravitate to the sewer, or sink, and thence to the sewer.

The case or duplex cylinder is cast in one piece, the auxiliary cylinder crossing the main cylinder at right angles, thus leaving four projecting ends of the cylinders. An internal ring is cast in each end, outside of the central chamber, but leaving sufficient space between it and the cylinder-head to form a gravel-chamber, which may be cleaned at proper intervals. In finishing the casting it is only necessary to place the same in a lathe and finish these rings into a true cylinder, the other portions being left rough without affecting the efficiency of the device. In each of these rings are formed both the entrance-ports from the receiving-chamber and the exit-ports to the changing chutes connecting the ends of the cylinders.

In meters of this class it is not only desirable, but absolutely necessary, that each piston-stroke should be complete and so exact that the ports will have their full service area. To this end, and to provide for different thicknesses of packing and qualities of packing without affecting the stroke of either piston, I form recesses in the ends of each cylinder, in which I insert and secure cross-bars of sufficient thickness to accommodate the desired piston-stroke, which bars are affixed to the cylinder ends, flush therewith, so as not to interfere with any kind or thickness of packing.

The confined air in the barrels of the main piston buoys up the said piston and gives a minimum of friction, and the same result accrues to the auxiliary piston, as is obvious. By reason of the construction hereinbefore set forth my meter will work efficiently whatever may be the water-pressure, and by a registering mechanism of any ordinary construction properly attached the amount of water passing through the meter will be accurately and certainly ascertained.

It will be observed that the water which is between the piston-heads and cylinder-heads before the piston starts its stroke is forced into the central cavity through the external chutes in an opposite direction to that taken by the water under force, which automatically shifts the pistons.

As the registering mechanism forms no part of this invention, and as any well-known arrangement may be employed, no specific registering device has been shown, it being understood as a necessary feature to the meter.

The invention is fully illustrated in the accompanying drawings, which form a part of this specification, and in which—

Figure 2:
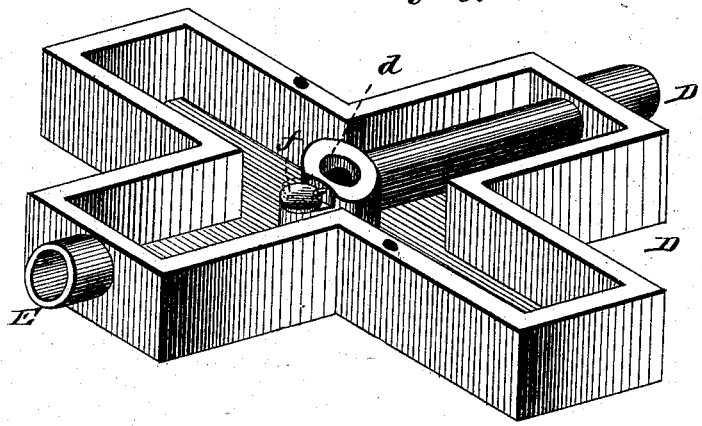
Figure 3:
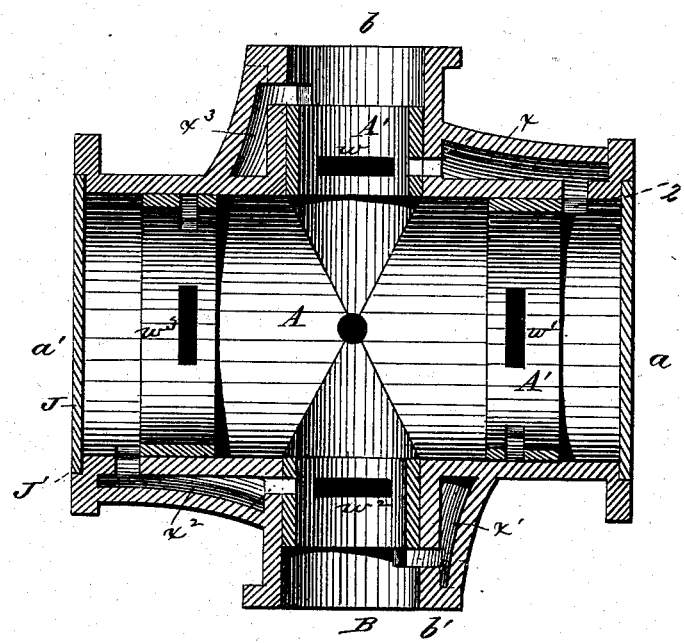
Figure 4:
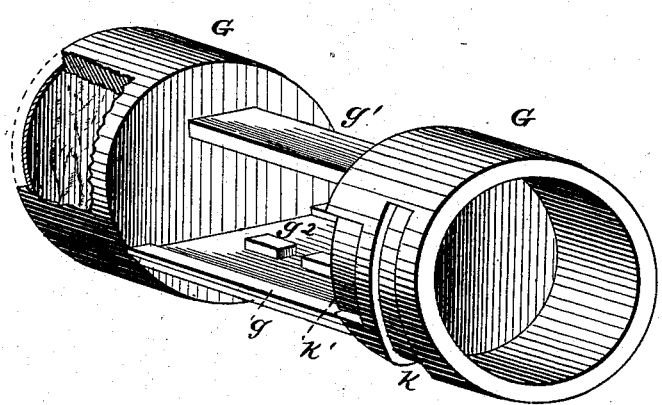
Figure 4:
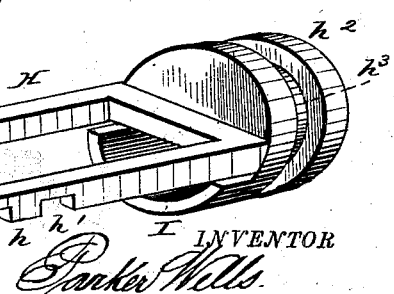

Figure 1 is a bottom plan view of the meter with the cap of the receiving-chamber removed; Fig. 2, a perspective view of the said cap, showing the lift-valve, &c.; Fig. 3, a horizontal section of the case, looking downward, showing the internal rings and system of ports; and Fig. 4, a perspective view of the two pistons displaced, said view being partly broken away. Fig. 5 is a horizontal section, looking downward.

To enable others skilled in the art to make and use the invention, I will describe the device by referring by letter to the drawings, in each figure of which similar letters of reference indicate like parts.

A represents the main cylinder, and B the auxiliary cylinder, the ends of the former of which I shall designate as $a\ a'$, and the latter as $b\ b'$. These portions form a series of four chambers, each adjacent pair being connected by external chutes, $x\ x'\ x^2\ x^3$, as shown. These cylinders are formed of a single casting, and upon the lower side is located the receiving-chamber C, having a tight seat, properly packed, to which is secured the cap D. This cap has an exit-pipe, D', which seats tightly upon a projection, $d$, affording an open connection with the central cavity in the cylinders. This receiving-chamber radiates correspondingly to the two cylinders, and is provided with the ports $w$ $w'$ $w^2$ $w^3$, as shown, which ports open into the cylinders.

An inlet-pipe, E, is adapted to be connected with a branch from the street-main, and the pipe D' connects with the service-pipes of the house.

A valve, $f$, connects with the house-pipe D', and as soon as the water force is cut off from the street and a proper cock (not shown) opened between the pipe E and the sewer the water in the house-pipes by its gravity opens the valve $f$ and runs to waste, thus avoiding all danger of frozen or burst pipes.

Within the main cylinder operates the main piston, composed of air-tight barrels G, connected by a plate, $g$, and proper braces $g'$. The contained air in the barrels G serves to buoy up the weight of the piston, and thus lessen friction.

H represents the auxiliary piston, the frame $h$ of which rests partly upon the plate $g$, and is provided with recesses $h'$, which serve, in connection with lugs $g^2$ upon the plate $g$, to allow the alternate stroke of either piston when the other has completed its full stroke, but locks it firmly against movement until such stroke is made.

The auxiliary-piston heads $h^2$ are each provided with annular recesses or grooves $h^3$, one of which registers with either the chute $x$ or $x^2$ and simultaneously with the port $w$ or $w^2$, according as the said piston has completed its stroke in either direction, a segmental leaf, I, closing the port $w$ when the port $w^2$ is open, and vice versa.

Upon the main-piston barrels G are formed segmental recesses $k$, one of which registers with either the chute $x'$ or $x^3$ and simultaneously with either the port $w'$ or $w^3$, according to the direction in which the piston has completed its stroke. Recesses $k'$ allow the water in either of the cylinder-heads $b$ $b'$ to be forced into the central aperture as the auxiliary piston makes its stroke. Thus, as shown in Fig. 5, the groove $k$ registers with the chute $x'$ upon one barrel, while the recess $k'$ connects with the chute $x^3$ upon the other barrel, and this same arrangement would be true when the piston has made the opposite stroke, only in a reverse way.

To avoid the expense and trouble of boring each of the cylinders throughout, each cylinder-head is cast with an internal ring, A', of sufficient area to accommodate the stroke of the piston-head. These rings are bored to a true cylinder, and the remaining parts may be left rough. The ports $w$ $w'$ $w^2$ $w^3$ and the ports from the heads $b$ $b'$ into the chutes $x$ $x^2$ are formed in these rings.

Recesses J, formed or cast in the ends of the cylinders, receive cross-bars J', which limit the length of the piston-stroke to such a nicety that a proper registration of the proper ports will be insured without interfering with the packing of the cylinder-heads, which would give and render such strokes unreliable.

It must be observed that the connecting-chutes are outside the cylinder, and that no valve or other mechanism liable to clog or get out of order is made or used in the cylinders, and also that the same chutes accommodate the flow of water in reverse directions—that is to say, when the head $b'$ is filling, as shown by full arrows, the head $b$ is emptying, as shown by dotted arrows, and when the head $b$ is filling the head $b'$ is emptying, the force of water which moves the pistons moving in an opposite direction to the water being forced out of the cylinder-head by the piston-stroke.

The operation of the device is as follows: As shown in Fig. 5, the main piston has made its stroke, forced by the water passing through port $w$ and chute $x$ into the cylinder-head $a$, and the water in the head $a'$ has been forced through the chute $x^2$ into the central cavity in a reverse direction. This stroke of the main piston has made the port $w'$ register with the segmental recess $k$, and said recess with the chute $x'$, leading the force of water into the auxiliary-cylinder head $b'$, and forcing the auxiliary piston over until the port $w$ is closed, and the water in the head $b$ is forced through the chute $x^3$ in a reverse direction and into the central cavity through the recess $k'$. This stroke will make the port $w^2$, annular recess in the auxiliary-piston head, and chute $x^2$ register, directing the force of water into the head $a'$, which will give the main piston its return-stroke, and so on, the lugs $g^2$ and recesses allowing the alternate strokes of the pistons as soon as the prior stroke is completed, but not before, and the water force changing the valves automatically as the ports and chutes register.

Having thus fully described my invention, what I claim, and desire to secure by Letters Patent of the United States, is—

1. A water-meter having cross-cylinders and external chutes to lead the water under force to reciprocating cross-pistons, and from said pistons to the service-pipes after measurement, the pistons acting alternately and automatically without the aid of internal valves or other moving mechanism, as herein specified.

2. A water-meter case having internally-projecting rings covering the area of the stroke of the piston-heads, said case being formed of cross-cylinders adapted to receive alternately-acting pistons and to be formed into a true cylinder by turning, boring, or otherwise, as set forth.

3. In a water-meter, the main piston and auxiliary piston, both being buoyed up against friction by confined air and operating at approximately right angles with each other, as set forth.

4. In a water-meter, a lift-valve adapted to allow the water in the house-pipes to gravitate into the sewer as the water-pressure is cut off, as and for the purposes set forth.

5. The main piston G, having lugs $g^2$ upon the plate $g$, combined with the auxiliary piston H, having the recesses $h'$, adapted to serve with the cross-cylinders A B, as set forth.

6. The receiving-chamber C, having ports $w$ $w'$ $w^2$ $w^4$, combined with the pistons G H, having connecting and shifting recesses, and with the cross-cylinders A B, as set forth.

7. The removable cap D, having exit D', aperture $d$, and inlet E, combined with the case A B, having central aperture, and with pistons and ports, as and for the purposes specified.

8. The cap D, having pipes D' and E, combined with the valve $f$ and case A B C $d$, as and for the purposes set forth.

9. The cross-cylinders A B, having chamber C, ports $w$ $w'$, &c., and chutes $x$ $x'$, &c., combined with the pistons and chamber-cap D, as set forth.

10. The piston G, having groove $k$, recess $k'$, and connected barrels, and the auxiliary piston H, with heads $h^2$, having annular recesses $h^3$, combined with the ports in the cross-cylinders A B, as and for the purposes set forth.

11. The recesses J' in the cylinder-heads, and the cross-bars J, adapted to limit and control the stroke of the pistons G H, as specified.

In testimony whereof I affix my signature in presence of two witnesses.

PARKER WELLS.

Witnesses:
H. CLAY SMITH,
JOHN J. BEATTY.